Dec. 17, 1957  M. A. GARRISON  2,816,440
TENSION TYPE PRESSURE RECORDER
Filed Jan. 10, 1955
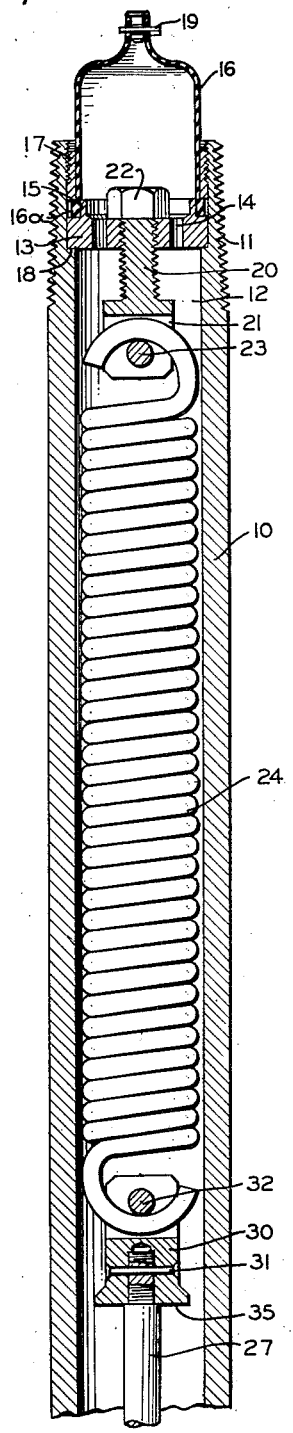
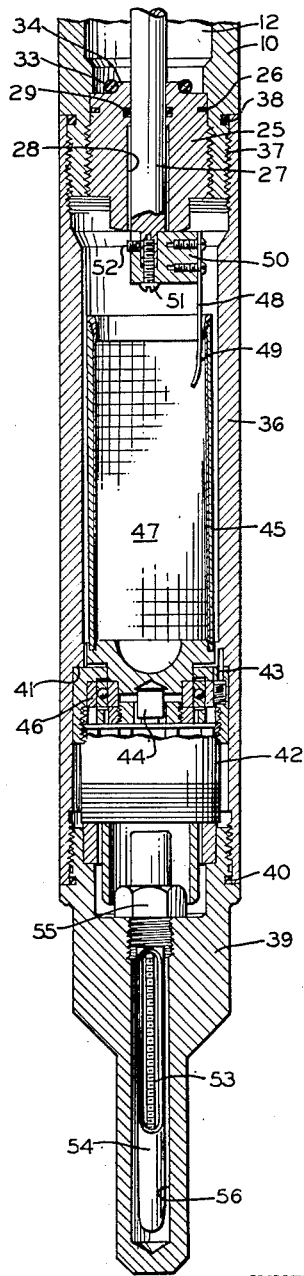
INVENTOR.
MARION A. GARRISON
BY
Mellin and Hanscom
ATTORNEYS

United States Patent Office 2,816,440
Patented Dec. 17, 1957

2,816,440

TENSION TYPE PRESSURE RECORDER

Marion A. Garrison, South Pasadena, Calif., assignor, by mesne assignments, to Johnston Testers, Inc., Houston, Tex., a corporation of Texas Application January 10, 1955, Serial No. 480,707

1 Claim. (Cl. 73—151)

This application relates to the art of pressure recorders, and particularly relates to a pressure recorder for use in a well bore.

In the drilling and testing of oil wells it is very desirable to ascertain the pressures existing at various points within a well bore.

It is the principal object of this invention to provide a pressure recorder adapted to be lowered in a well bore, which recorder is capable of making a pressure chart, wherein the pressures are recorded against time, thereby providing a permanent record of the pressures of the various depths within a well when correlated with the depth against time records.

Another object of the invention is to provide a pressure recorder according to the preceding object, wherein the pressures within and without the major portion of the recorder are balanced.

A further object of this invention is to provide a pressure recorder, wherein the recording mechanism is moved by the differential pressure between the ambient well pressure and atmospheric pressure against the resistance of a spring acting in tension.

A still further object of the invention is to provide a pressure recorder according to any of the preceding objects in combination with a thermometer, whereby a simultaneous temperature and pressure reading may be obtained.

A preferred form of the invention is described in the following detailed specification, and illustrated in the accompanying drawings, wherein:

Fig. 1 is a longitudinal sectional view of the upper portion of a pressure recorder embodying the principles of the invention.

Fig. 2 is a longitudinal section of the lower portion of the pressure recorder.

Referring now to the drawings, 10 indicates a tubular cylinder having a thread 11 at its upper end adapted to be connected to a tubing string or wire line (not shown). The cylinder 10 defines a chamber 12, one end of which is closed by an end plate 13 having ports 14 formed therein. An annular flange 15 extends upwardly from the end plate 13 between the ports 14 and the outer edge of the plate. A bell-shaped flexible diaphragm 16, having an outwardly extending head 16a around its lower end, slidably engages the outer surface of the flange 15. A ring 17 is threaded into the upper end of the cylinder 10 and clamps the head 16a between its lower end and the upper surface of the end plate 13, and holds the end plate 13 against an upwardly facing shoulder 18 formed in the cylinder 10. A plug 19 closes the upper end of the diaphragm 16. A spring connector member 20, having a bifurcated lower end 21, is threaded into the end plate 13 centrally thereof and anchored therein by a lock nut 22. A pin 23 extends transversely between the leg portions of the bifurcated end 21, and the upper end of a spring 24 is hooked over the pin 23, the purpose of which spring will be hereinafter described.

The other end of the chamber 12 is closed by a head 25 screwed into the lower end of the cylinder 10. An O-ring 26 is mounted in a suitable groove on the head 25 and seals against the inner wall of the cylinder 10. One end of a rod 27 extends into the chamber 12 through a central bore 28 through the head 25. An O-ring 29 is mounted in a groove in the head 25 and seals against the exterior of the rod 27. A bifurcated connector member 30 is connected to the upper end of the rod 27 by a pin 31. The lower end of the spring 24, previously described, is connected to the connector member 30 by a pin 32 extending between the bifurcated leg portions thereof. An O-ring 33 is mounted adjacent the upper surface of the head 25, surrounding an upstanding central boss 34 formed integrally therewith. The O-ring 33 is adapted to be contacted by and seal against the lower surface 35 of the connector member 30 when the rod 27 is fully extended.

A tubular member 36 is threadedly connected, as shown at 37, to the lower end of the cylinder 10 and extends downwardly therefrom, and a sealing ring 38 seals the joint therebetween. A lower head 39 is screwed into the lower end of the tubular member 36 and a sealing ring 40 seals the joint therebetween. The lower end of the tubular member 36 is counterbored to provide a downwardly facing shoulder 41. A clockwork mechanism, generally indicated at 42, is held between the downwardly facing shoulder 41 and the lower head 39. The casing of the clockwork mechanism is held against rotation relative to the tubular member 36 by a spring-pressed pin 43 extending into a suitable bore in the shoulder 41. A central rotating shaft 44 extends upwardly from the clockwork mechanism 42, and is connected to a chart tube 45 rotatably supported on a bearing 46 mounted on the casing of the clockwork mechanism. The specific details of the clockwork mechanism form no part of the instant invention. It is merely any mechanism which is capable of rotating the shaft 44 with a constant speed of rotation. A record chart 47 is adapted to be placed within the chart tube 45 against the inner wall thereof.

A stylus 48, having a marking point 49, is connected to a block 50. The block 50 is adjustably connected to the lower end of the rod 27 by a screw 51 and locking set screw 52, whereby the position of the marking point 49 may be adjusted vertically relative to the rod 27 to zero the recorder. The marking point 49 is adapted to contact and move over the surface of the chart 47.

A thermometer 53 is encased in a windowed metal tube 54 having a threaded head 55 adjacent its upper end. The tube 54 is suspended in a thermometer well 56 provided in the lower head 39, with the head 55 threaded into the upper end of the well.

In the use of the device, a suitable wire line or well string is connected to the upper end thereof by means of the thread 11. The chart 47 is inserted in the chart tube 45, and the tube 45 together with the clockwork mechanism 42 is inserted in the tubular member 36, which is then sealed at atmospheric pressure by screwing in the lower head 39. The chamber 12 is filled with oil and the diaphragm 16 is sealed closed by the plug 19. The clockwork 42 is started and the device is lowered into the well. As the ambient pressure increases, the diaphragm 16 is collapsed, increasing the pressure on the oil in the chamber 12. The increased pressure in the chamber 12 acts on the upper end of the rod 27 to push the rod downwardly against the tension of the spring 24 and the atmospheric pressure within the tubular member 36 acting on the lower end of the rod. In this manner, since the spring constant is known or may be calculated, the downward movement of the rod 27 and the marking point 49 connected thereto is directly related to the ambient well pressure. By maintaining a chart of the depth of the tool plotted against time, the pressure existing at any depth within the well may be obtained from the chart 47 by a comparison of the two charts.

When the tool is retrieved from the well, the head 39 is removed and the thermometer tube 54 removed from the well 56 therein and read to determine the temperature existing in the well bore.

From the foregoing specification it may be seen that I have provided a relatively simple device for recording well pressures, which device is extremely accurate in its readings, and wherein a permanent chart of the pressure readings is obtained.

While I have shown and described the preferred form of my invention, it is to be understood that various changes may be made in its construction by those skilled in the art, without departing from the spirit of the invention as defined in the appended claim.

Having thus described my invention, what I claim and desire to secure by Letters Patent is:

In a pressure recorder, an oil filled cylinder, a flexible bell-shaped diaphragm closing one end of said cylinder, said diaphragm being exposed on its inner surface to the oil pressure within said cylinder and having its outer surface adapted to be exposed to the ambient well pressure so that said bell-shaped diaphragm may be collapsed by the ambient well pressure, a rod extending through the other end of said cylinder, a head on the inner end of said rod, sealing means between said rod and said other end of said cylinder, an annular seal on the inner surface of said other end of said cylinder surrounding but spaced from said rod, said annular sealing means being adapted to be contacted by the head on the inner end of said rod when said rod reaches its limit of outward travel, spring means urging said rod to enter said cylinder, means connected to said other end of said cylinder forming an enclosure around the outer end of said rod, whereby as the well pressure increases the oil pressure within said cylinder increases to force said rod outwardly into said enclosure against the resistance of said spring means, a record blank mounted for rotation within said enclosure outside of and adjacent said other end of said cylinder, a stylus connected to the outer end of said rod and in contact with said record blank, and a clockwork mechanism for rotating said record blank.

References Cited in the file of this patent

UNITED STATES PATENTS

| | | |
|---|---|---|
| 1,969,141 | McDonald | Aug. 7, 1934 |
| 2,223,913 | Johnston | Dec. 3, 1940 |
| 2,674,126 | Coberly | Apr. 6, 1954 |
| 2,689,144 | Uhrig et al. | Sept. 14, 1954 |
| 2,700,307 | Thoreson | Jan. 25, 1955 |
| 2,711,649 | Baker | June 28, 1955 |

FOREIGN PATENTS

| | | |
|---|---|---|
| 954,080 | France | June 6, 1949 |